United States Patent [19]
Chiba

[11] Patent Number: 5,924,285
[45] Date of Patent: Jul. 20, 1999

[54] MASTER CYLINDER TANK

[75] Inventor: Syusaku Chiba, Higashimatsuyama, Japan

[73] Assignee: Jidosha Kiki Co., Ltd., Tokyo, Japan

[21] Appl. No.: 08/855,323

[22] Filed: May 13, 1997

[30] Foreign Application Priority Data

May 14, 1996 [JP] Japan ..................................... 8-118570

[51] Int. Cl.⁶ ............................. B60T 11/26; G01F 23/30
[52] U.S. Cl. ................................................. 60/585; 73/309
[58] Field of Search ........................... 60/535, 545, 585; 116/110, 228; 200/84 C; 73/309, 320

[56] References Cited

U.S. PATENT DOCUMENTS

| | | | |
|---|---|---|---|
| 843,166 | 2/1907 | Mcnutt | 73/320 |
| 1,742,739 | 1/1930 | Farnsworth | 73/320 |
| 1,786,339 | 12/1930 | Ford | 73/320 |
| 3,246,517 | 4/1966 | Malkiewicz | 200/84 C X |
| 3,342,960 | 9/1967 | Dillon et al. | 200/84 X |
| 3,366,276 | 1/1968 | Fridley | 200/84 C X |
| 3,678,232 | 7/1972 | Hodges | 200/84 C |
| 4,444,052 | 4/1984 | Reinartz et al. | 116/228 X |
| 4,487,021 | 12/1984 | Arakawa et al. | 200/84 C X |
| 4,615,175 | 10/1986 | Ishiwata et al. | 60/535 |
| 5,041,812 | 8/1991 | Misaizu et al. | 200/84 C X |

FOREIGN PATENT DOCUMENTS 58-43541  9/1956  Japan .

*Primary Examiner*—John E. Ryznic
*Attorney, Agent, or Firm*—Fish & Richardson P.C.

[57] ABSTRACT

An object of the present invention is to provide a master cylinder which decreases the number of necessary parts, achieves easy assembly and stabilized quality, and surely prevents a float from coming off. In the present invention, the master cylinder tank 20 contains working fluid in the interior of a tank body 21 and incorporates a float 25 movable vertically in response to the increase and decrease in the working fluid by being guided by a float guide 22, and coming-off preventive portions 24, 24, capable of being deformed elastically, are provided to cover at least a part of the float 25 by extending a part of the float guide 22 upward beyond a guide rib 23. The coming-off preventive portions 24, 24 are formed by being bent to the inside into a shape such as to partially cover the float 25, so that the float 25 is prevented from coming off by the coming-off preventive portions 24, 24.

19 Claims, 3 Drawing Sheets

MASTER CYLINDER TANK

FIELD OF THE INVENTION AND RELATED ART STATEMENT

The present invention relates to a tank for a master cylinder used in a vehicular brake system etc.

In a conventional master cylinder tank, as shown in FIG. 3, a float 4 is housed so as to be movable vertically by being guided by a guide rib 3 formed on a float guide 2 in a reservoir body 1, a magnet 5 embedded in the lower part of the float 4 and a reed switch 7 disposed just under a bottom plate 6 under the magnet 5 are provided, and the float is prevented from coming off by a retaining ring 8 installed at the upper end of the guide rib 3. The magnet 5, in cooperation with the reed switch 7, electrically detects a decrease in fluid in the reservoir body 1.

In another conventional master cylinder tank disclosed in Japanese Utility Model Provisional Publication No. 58-43541 (No. 43541/1983), as shown in FIGS. 4 and 5, a float 12 is provided so as to be movable vertically in a space surrounded by a cylindrical containing wall 11 in a reservoir body 10, coming-off preventive protrusions 13 are provided at the upper end on the inner surface of the containing wall 11, and engagement protrusions 14 are provided on the float 12 to prevent the float 12 from coming off from a space surrounded by the containing wall 11 by engaging with the coming-off preventive protrusion 13.

OBJECT AND SUMMARY OF THE INVENTION

However, the master cylinder tank shown in FIG. 3, which uses the retaining ring 8 pressed to prevent the float 4 from coming off, has disadvantages of increased number of necessary parts, poor assembling properties, and unstable quality. The tank shown in FIGS. 4 and 5, which is provided with the coming-off preventive protrusions 13 on the inside of the containing wall 11, has a disadvantage that the float 12 easily comes off because the coming-off preventive protrusions cannot be made so large from the viewpoint of removal from a mold in molding.

The present invention was made in view of the above disadvantages, and accordingly an object thereof is to provide a master cylinder tank which decreases the number of necessary parts, achieves easy assembly and stabilized quality, and surely prevents a float from coming off.

To achieve the above object, the present invention provides a master cylinder tank which contains working fluid in the interior of a tank body and incorporates a float movable vertically in response to the increase and decrease in the working fluid by being guided by a float guide, characterized in that a coming-off preventive portion, capable of being deformed elastically, is provided to cover at least a part of the float by extending a part of the float guide upward beyond a guide rib.

Also, the present invention provides a master cylinder tank characterized in that the coming-off preventive portion is formed by being bent to the inside into a shape such as to partially cover the float.

Further, the present invention provides a master cylinder tank characterized in that the coming-off portion is formed by being bent into an arcuate shape.

The present invention achieves the effects as described below.

In the present invention, the coming-off preventive portion, capable of being deformed elastically, is provided to cover at least a part of the float by extending a part of the float guide upward beyond the guide rib. Therefore, when the float is assembled, the float can easily be inserted into the float guide by elastically deforming the coming-off preventive portion, and after the assembly is finished, the float can surely be prevented from coming off by the coming-off preventive portion. Also, since the coming-off preventive portion is integral with the float guide, the number of necessary parts can be decreased.

In the present invention, the coming-off preventive portion is formed by being bent to the inside into a shape such as to partially cover the float. Therefore, the coming-off preventive portion can be manufactured easily, the cost is low, and the float can more surely be prevented from coming off.

In the present invention, the coming-off preventive portion is formed by being bent into an arcuate shape. Therefore, the float can be assembled very easily.

DETAILED DESCRIPTION OF PREFERRED EMBODIMENTS

Figure 1:
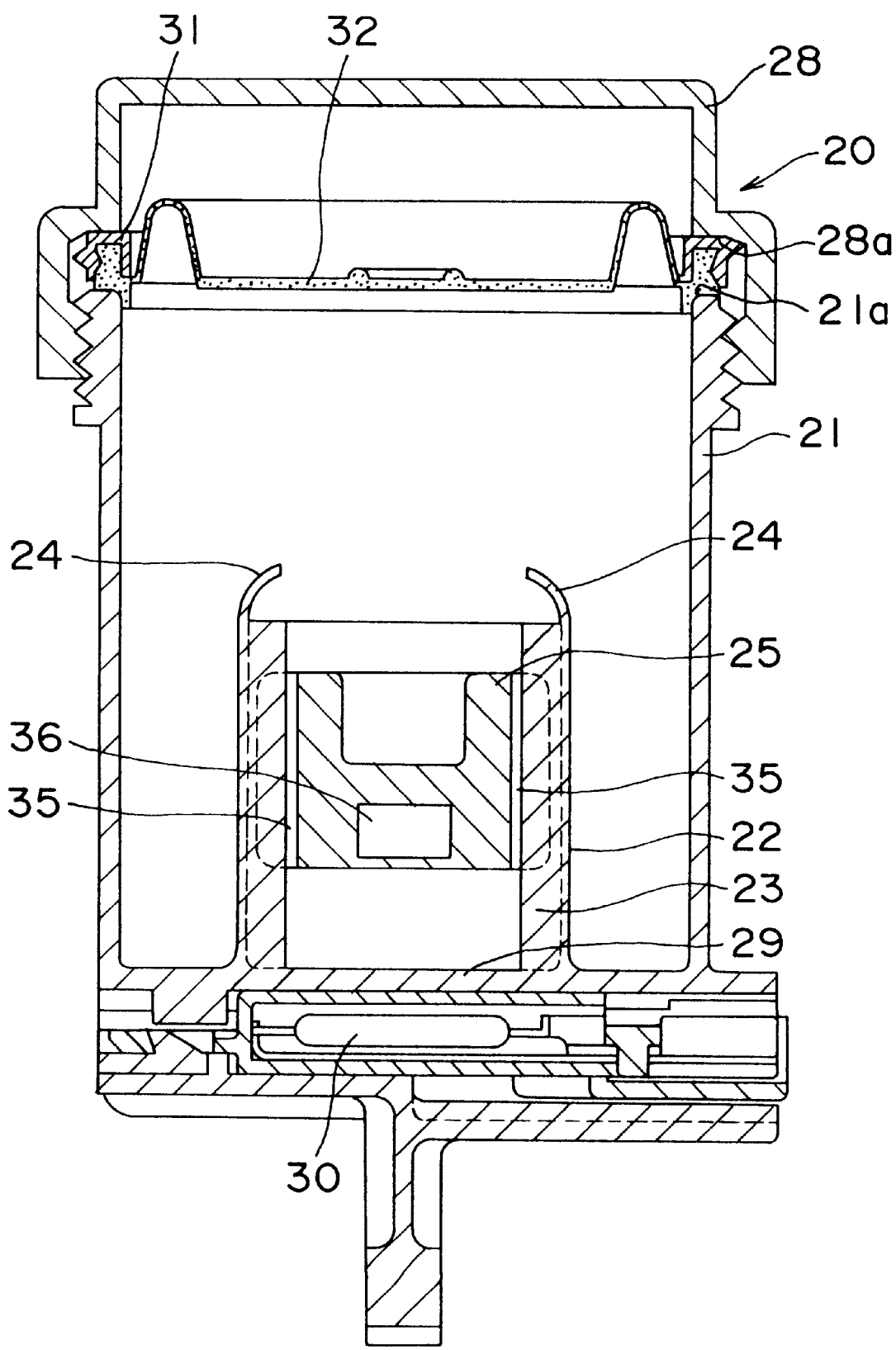
FIG. 1 is a longitudinal sectional view of a master cylinder tank in accordance with an embodiment of the present invention.
Figure 2:
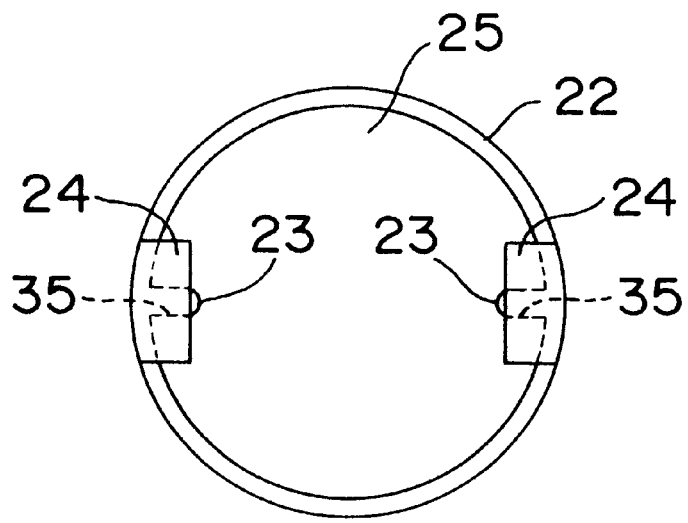
FIG. 2 is a plan view showing only the principal portion of a master cylinder tank shown in FIG. 1.
Figure 3:
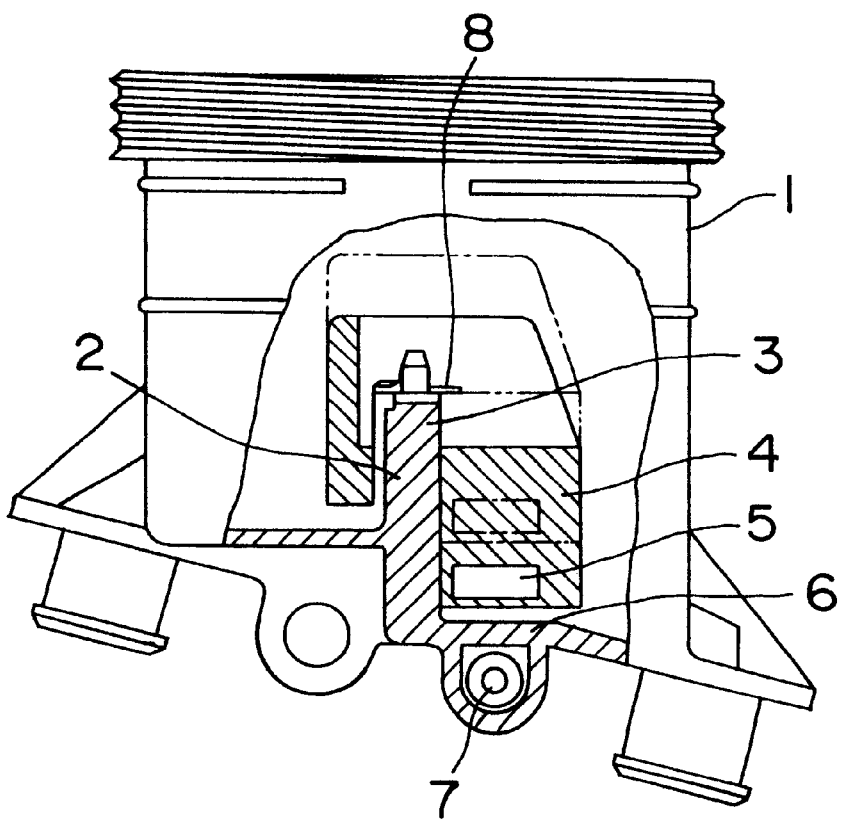
FIG. 3 is a partially broken side view of a conventional master cylinder tank.
Figure 4:
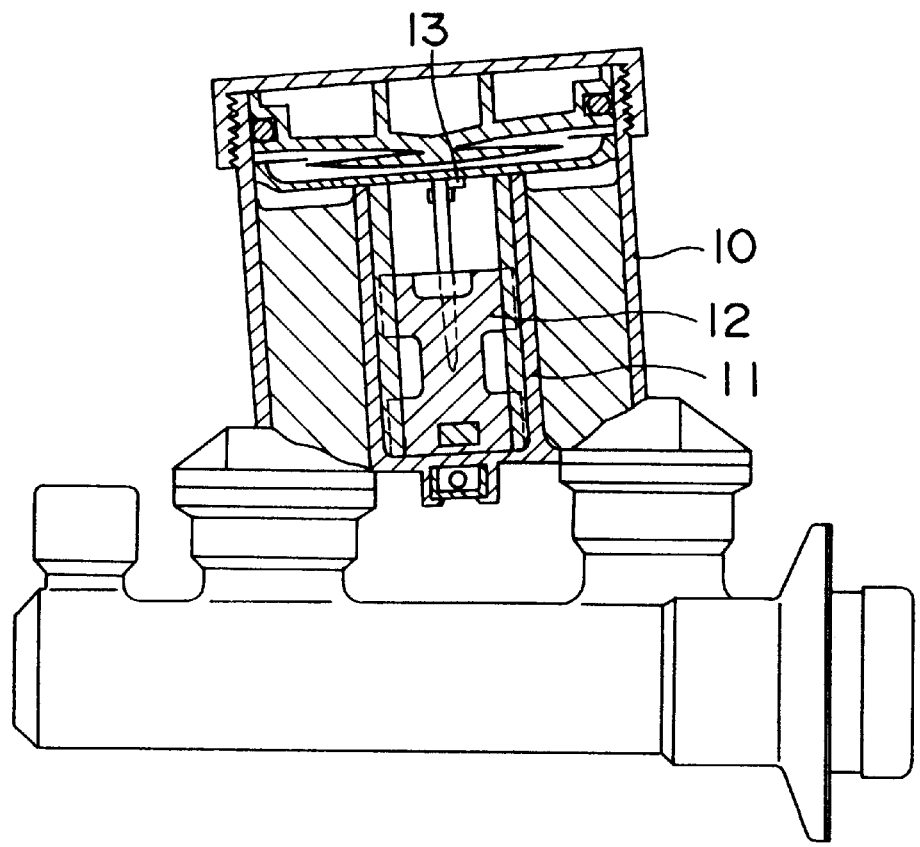
FIG. 4 is a partial longitudinal sectional view of another conventional master cylinder tank.
Figure 5:
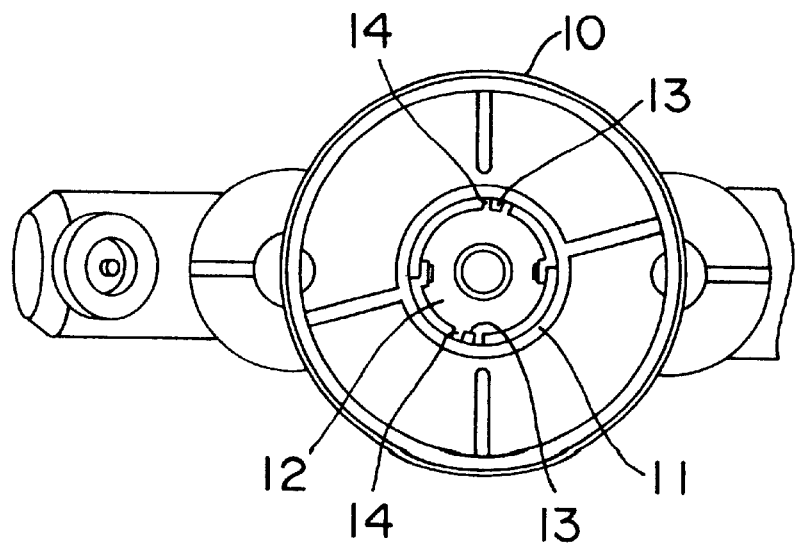
FIG. 5 is a plan view showing the opened upper part of the tank shown in FIG. 4.

FIG. 1 is a longitudinal sectional view of a master cylinder tank in accordance with an embodiment of the present invention, and FIG. 2 is a plan view showing only the principal portion of a master cylinder tank shown FIG. 1. This master cylinder tank 20 has a cylindrical float guide 22 which is integral with a tank body 21 containing working fluid and is open at the upper end. A pair of coming-off preventive portions 24, 24 are provided at the upper ends of guide ribs 23, so that a float 25, which is incorporated in the float guide 22 and moves vertically, is prevented from coming off by the coming-off preventive portions 24.

The tank 20 is configured so that a cap 28 is screwed on the upper end portion of peripheral wall of the tank body 21 made of a thermoplastic resin, a reed switch 30 housed in a space under a bottom plate 29 is provided, a diaphragm 32 is disposed so that the peripheral edge thereof is held with a guide ring 31 interposed between the upper end face 21a of the peripheral wall and step lower face 28a of the cap 28, and the float guide 22 is provided integrally with the bottom plate 29.

Also, the tank 20 has a supply hole for supplying working fluid into the tank body 21 of the master cylinder at a not illustrated position of the bottom plate 29. The guide ring 31 prevents the diaphragm 32 from turning together with the cap 28 when the cap 28 is turned. The diaphragm 32 is used to always keep the internal pressure of a reservoir containing working fluid at the atmospheric pressure by being displaced by the variation in working fluid level caused by the change in atmospheric temperature.

The float guide 22, being cylindrical in shape, has the two guide ribs 23 extending straight vertically on the inner surface thereof, and is provided with the paired coming-off preventive portions 24, 24 extending upward beyond the guide ribs 23 at positions corresponding to the guide ribs 23 on the circumference.

The paired coming-off preventive portions 24, 24 are formed so that the upper end portions of the float guide 22 are extended upward, the portion corresponding to a quarter of circle is bent into a partially arcuate shape to the inside, and the respective extended portions cover a part of the float 25 and the guide rib 23 over a uniform width greater than a guide receiving groove 35 of the float 25 into which the guide rib 23 fits, so that the coming-off preventive portions are formed so as to cover a part of the float 25 and a great part of the guide rib 23.

Also, the paired coming-off preventive portions 24, 24 have a thickness and a width such that the portions are deformed elastically, so that they can be elastically deformed to a position of straight extension of the guide rib 23 when the float 25 is assembled, and can be restored to the original shape immediately after the assembly as shown in FIG. 1.

The float 25, formed of an expanded resin circular in horizontal cross section, has guide receiving grooves 35 extending straight from the upper end to the lower end at positions corresponding to the guide ribs 23. A magnet 36 is embedded in the center at the lower part corresponding to the reed switch 30. The float guide 22 is fitted to the guide receiving grooves 35 with a play, so that the float 25 is movable vertically with the increase and decrease in working fluid by being guided by the float guide 22.

When the float 25 is assembled, the coming-off preventive portions 24, 24 are deformed elastically to be opened, the guide receiving grooves 35 are aligned with the guide ribs 23, and the float 25 is inserted into the float guide 22. When the amount of working fluid is large, the float 25 rises in response to the fluid level, and is prevented from coming off by the coming-off preventive portions 24, 24. When the amount of working fluid decreases, the float 25 lowers, and the magnet 36, in cooperation with the reed switch 30, electrically detects a decrease in working fluid to a level below the reference amount.

In the case of the master cylinder tank 20 in accordance with the above embodiment of the present invention, when working fluid is poured into the tank body 21, the float 25 floats, but its rise is stopped by hitting the coming-off preventive portions 24, 24 of the float guide 22, so that the float 25 is surely prevented from coming off.

When the amount of working fluid in the tank body 21 decreases, the float 25 lowers along the guide ribs 23. When the fluid level lowers to a predetermined position, the reed switch 30 is actuated by the magnet 36. This actuation sounds an alarm buzzer or lights an alarm lamp in the driver's cabin. The decrease in working fluid is detected and told to the driver etc.

According to the above embodiment of the present invention, the coming-off preventive portions 24, 24, capable of being deformed elastically, are bent into an arcuate shape, so that the float 25 can be assembled very easily. Also, the coming-off preventive portions 24, 24 are provided by extending integrally with the float guide 22, which offers advantages of small number of necessary parts, easy manufacture, and low cost.

The present invention is not limited to the above embodiment, and various modifications can be made without departing from the spirit and scope of the invention. For example, only one or three or more coming-off preventive portions 24 can be provided, or the horizontal cross sections of the float guide 22 and the float 25 can be formed into any shape other than a circle.

What is claimed is:

1. A master cylinder tank designed to contain working fluid in the interior of a tank body, said master cylinder tank including a float movable vertically in response to an increase or a decrease in working fluid, said float being guided by a float guide having a guide rib, said float guide comprising an elastically deformable coming-off preventive portion, said portion covering at least a part of said float and including an upward extension beyond said guide rib of said float guide, wherein during normal operation said float can travel vertically along said float guide but is prevented from coming off said float guide by said coming-off preventive portion.

2. The master cylinder tank according to claim 1 wherein said portion is shaped so as to surround an outer periphery of said float and is formed by being bent to the inside into a shape such as to partially cover said float.

3. The master cylinder tank according to claim 1 wherein said portion is formed by being bent into an arcuate shape.

4. The master cylinder tank according to claim 2 wherein said portion is formed by being bent into an arcuate shape.

5. The master cylinder tank according to claim 1 comprising a plurality of coming-off preventive portions.

6. The master cylinder tank according to claim 2 comprising a plurality of coming-off preventive portions.

7. The master cylinder tank according to claim 3 comprising a plurality of coming-off preventive portions.

8. The master cylinder tank according to claim 4 comprising a plurality of coming-off preventive portions.

9. The master cylinder tank according to claim 1 further comprising working fluid in the tank body.

10. The master cylinder tank according to claim 2 further comprising working fluid in the tank body.

11. The master cylinder tank according to claim 3 further comprising working fluid in the tank body.

12. The master cylinder tank according to claim 4 further comprising working fluid in the tank body.

13. The master cylinder tank according to claim 5 further comprising working fluid in the tank body.

14. The master cylinder tank according to claim 6 further comprising working fluid in the tank body.

15. The master cylinder tank according to claim 7 further comprising working fluid in the tank body.

16. The master cylinder tank according to claim 8 further comprising working fluid in the tank body.

17. The master cylinder tank according to claim 1 further comprising an interval placed in a peripheral direction of said float guide and having a plurality of said coming-off preventive portions thereon.

18. The master cylinder tank according to claim 2 further comprising an interval placed in a peripheral direction of said float guide and having a plurality of said coming-off preventive portions thereon.

19. The master cylinder tank according to claim 3 further comprising an interval placed in a peripheral direction of said float guide and having a plurality of said coming-off preventive portions thereon.

* * * * *

UNITED STATES PATENT AND TRADEMARK OFFICE
CERTIFICATE OF CORRECTION

PATENT NO.   : 5,924,285
DATED        : July 20, 1999
INVENTOR(S)  : Syusaku Chiba It is certified that error appears in the above-identified patent and that said Letters Patent is hereby corrected as shown below:

Title page,
        Item [56], change "1,742,739" to --1,742,439--.

Signed and Sealed this

Fourteenth Day of December, 1999

Attest:

Q. TODD DICKINSON

Attesting Officer     Acting Commissioner of Patents and Trademarks